Feb. 1, 1927.
H. DOCK
1,616,029
INTERNAL COMBUSTION ENGINE
Filed Dec. 19, 1922       7 Sheets-Sheet 1
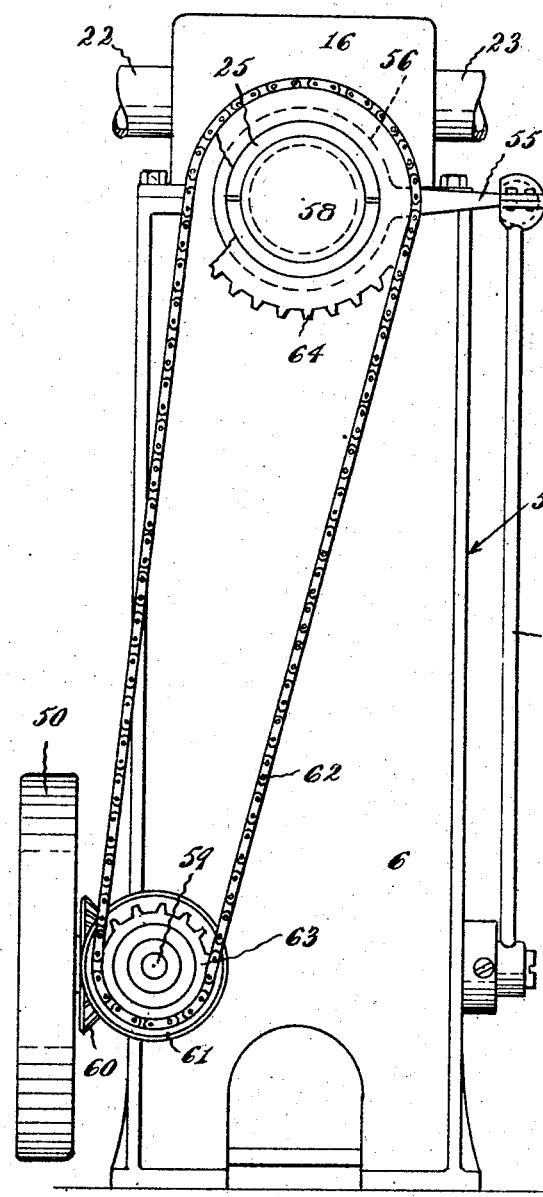
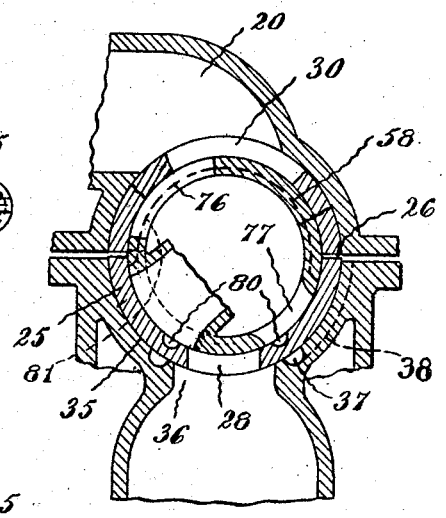
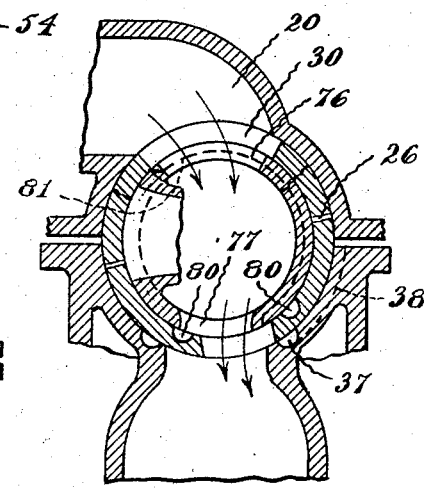
Witnesses:
Inventor:
Herman Dock,
By his Att'y,

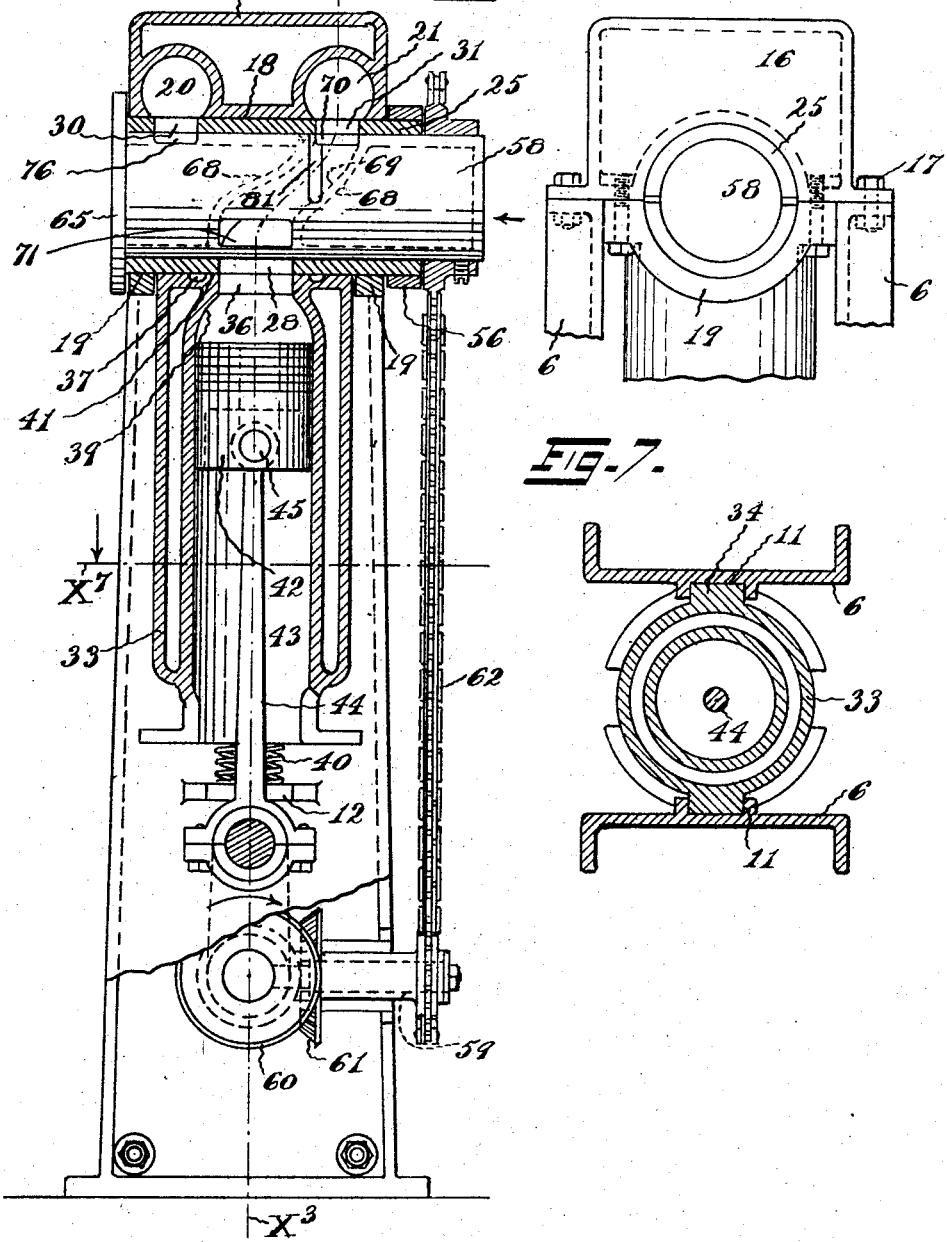

Feb. 1, 1927.
H. DOCK
1,616,029
INTERNAL COMBUSTION ENGINE
Filed Dec. 19, 1922    7 Sheets-Sheet 3
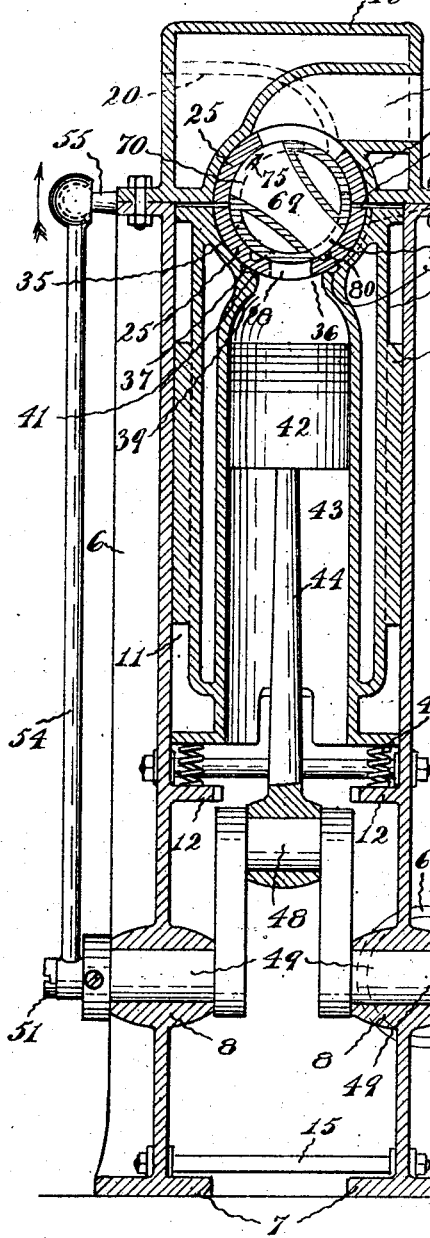
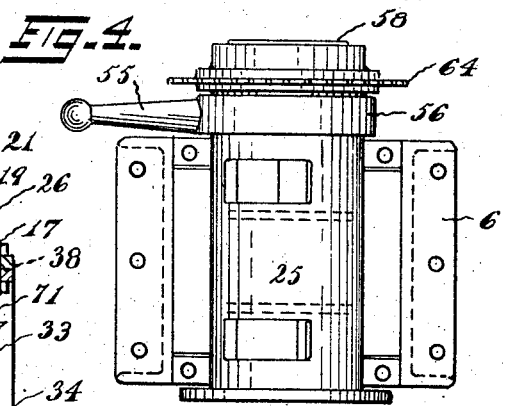
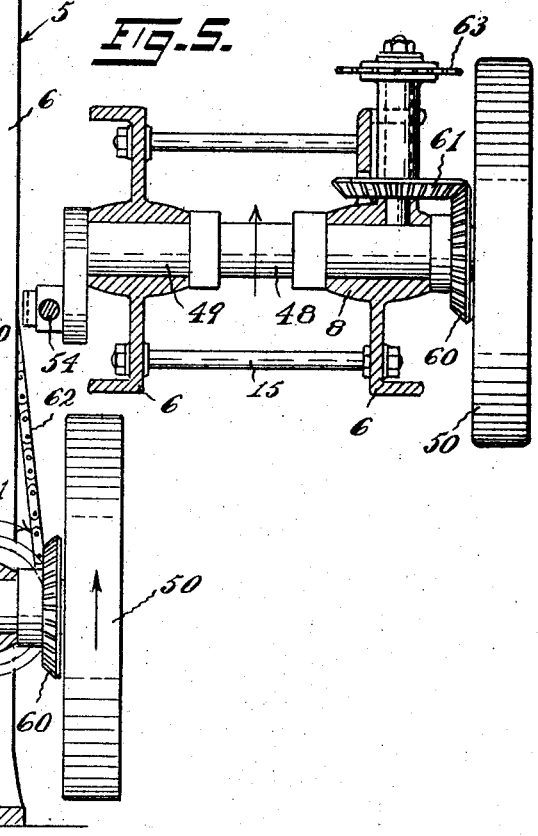
Witnesses:
Inventor:
Herman Dock,
By his Att'y, Feb. 1, 1927. 1,616,029
H. DOCK
INTERNAL COMBUSTION ENGINE
Filed Dec. 19, 1922 7 Sheets-Sheet 4
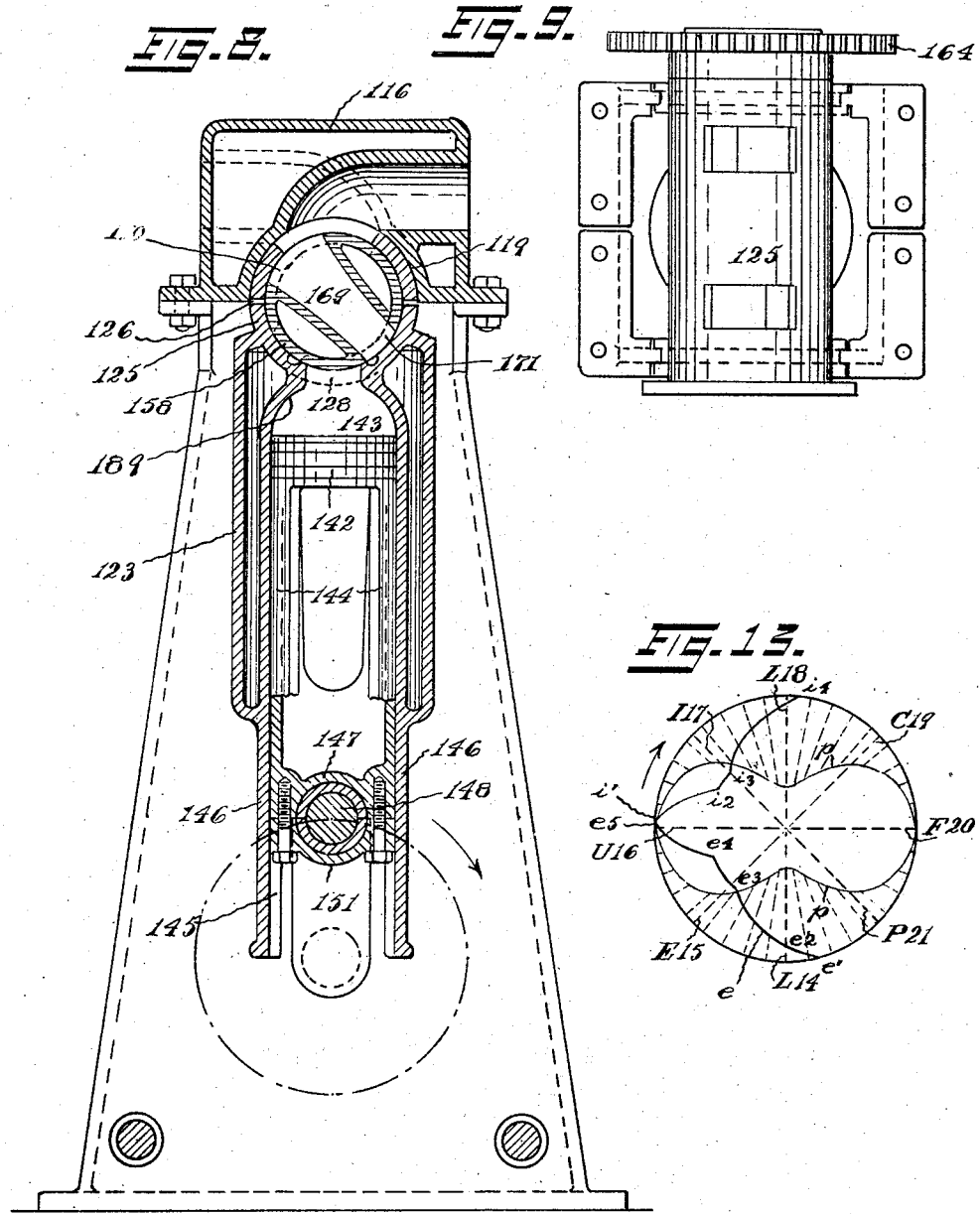
Witnesses:
Inventor:
Herman Dock,
By his Atty F. H. Richards Feb. 1, 1927.
H. DOCK
1,616,029
INTERNAL COMBUSTION ENGINE
Filed Dec. 19, 1922    7 Sheets-Sheet 5
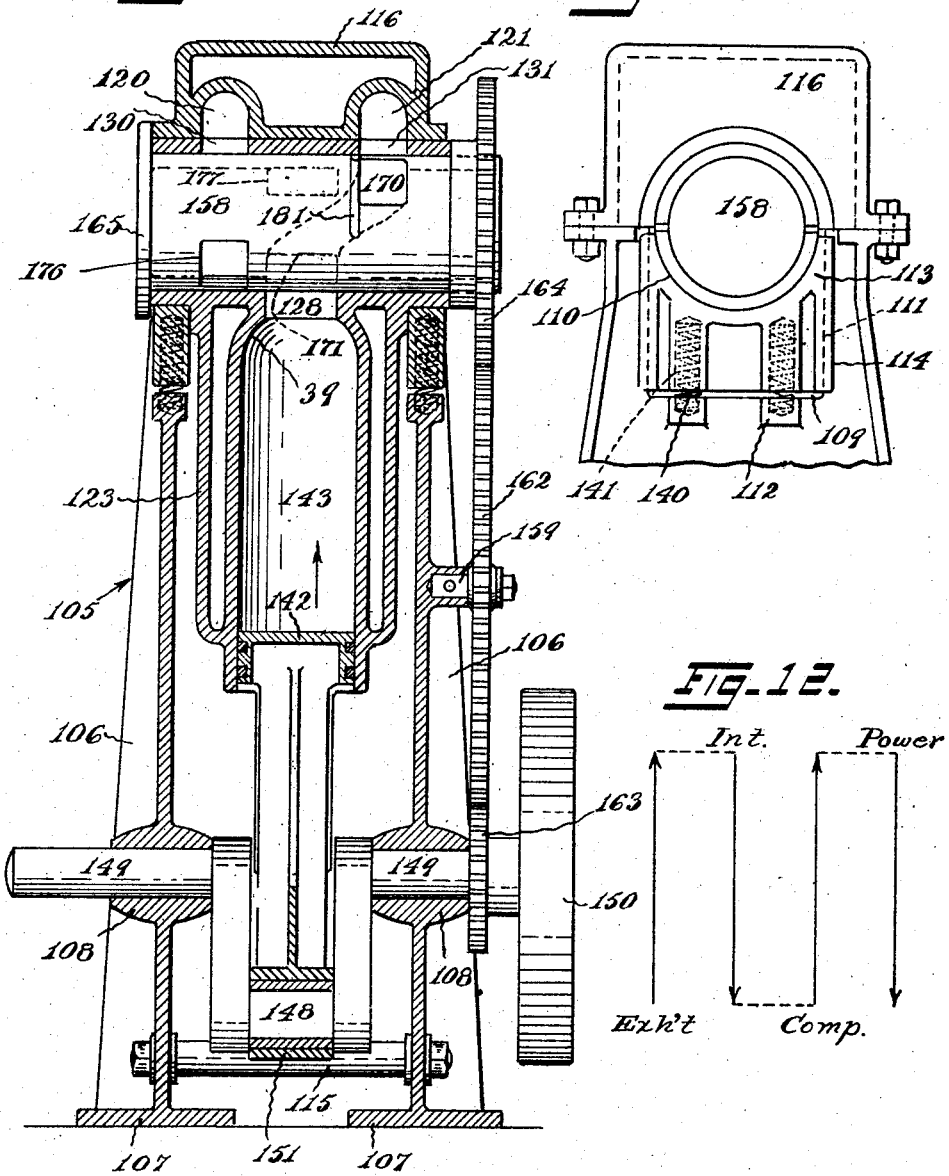

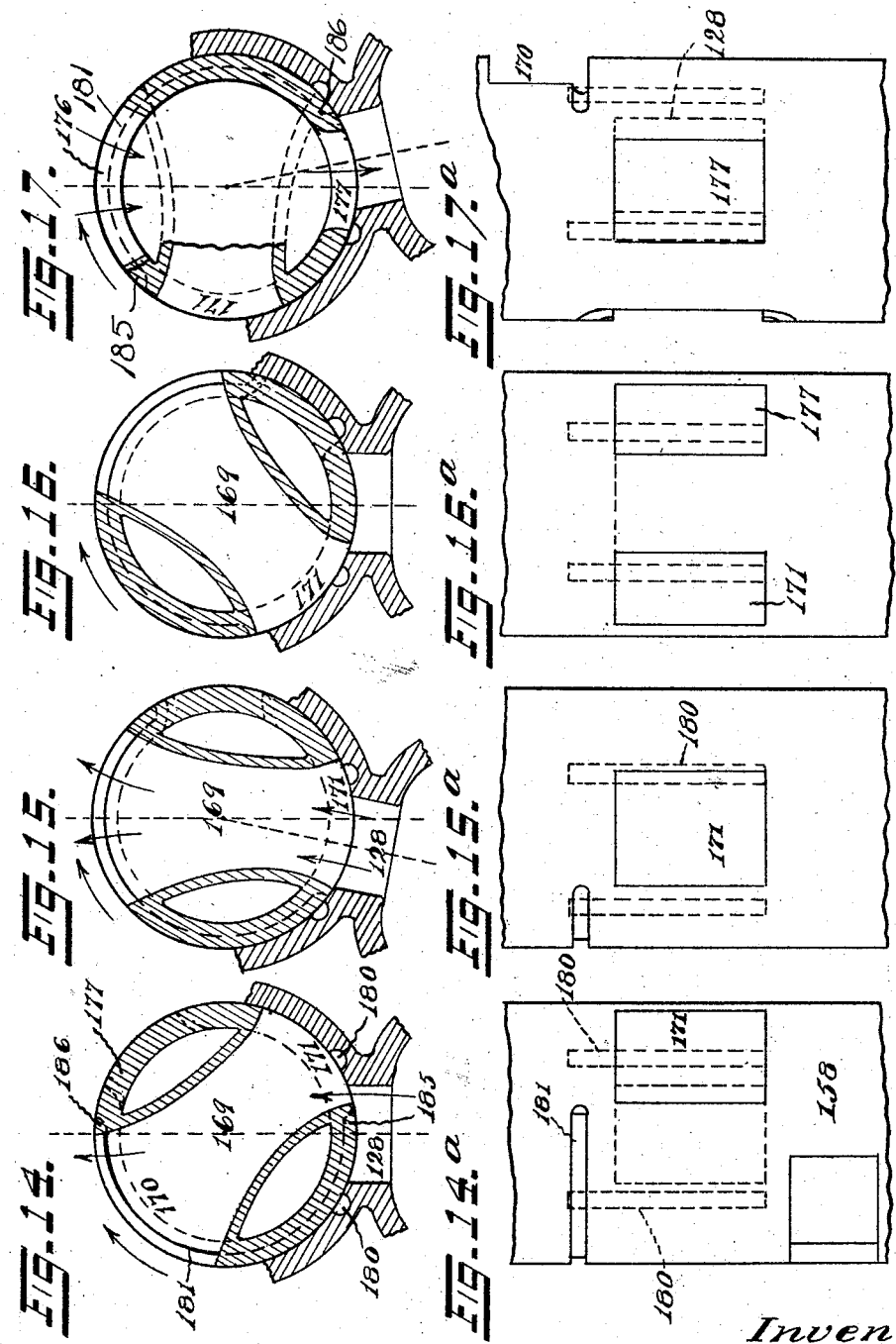

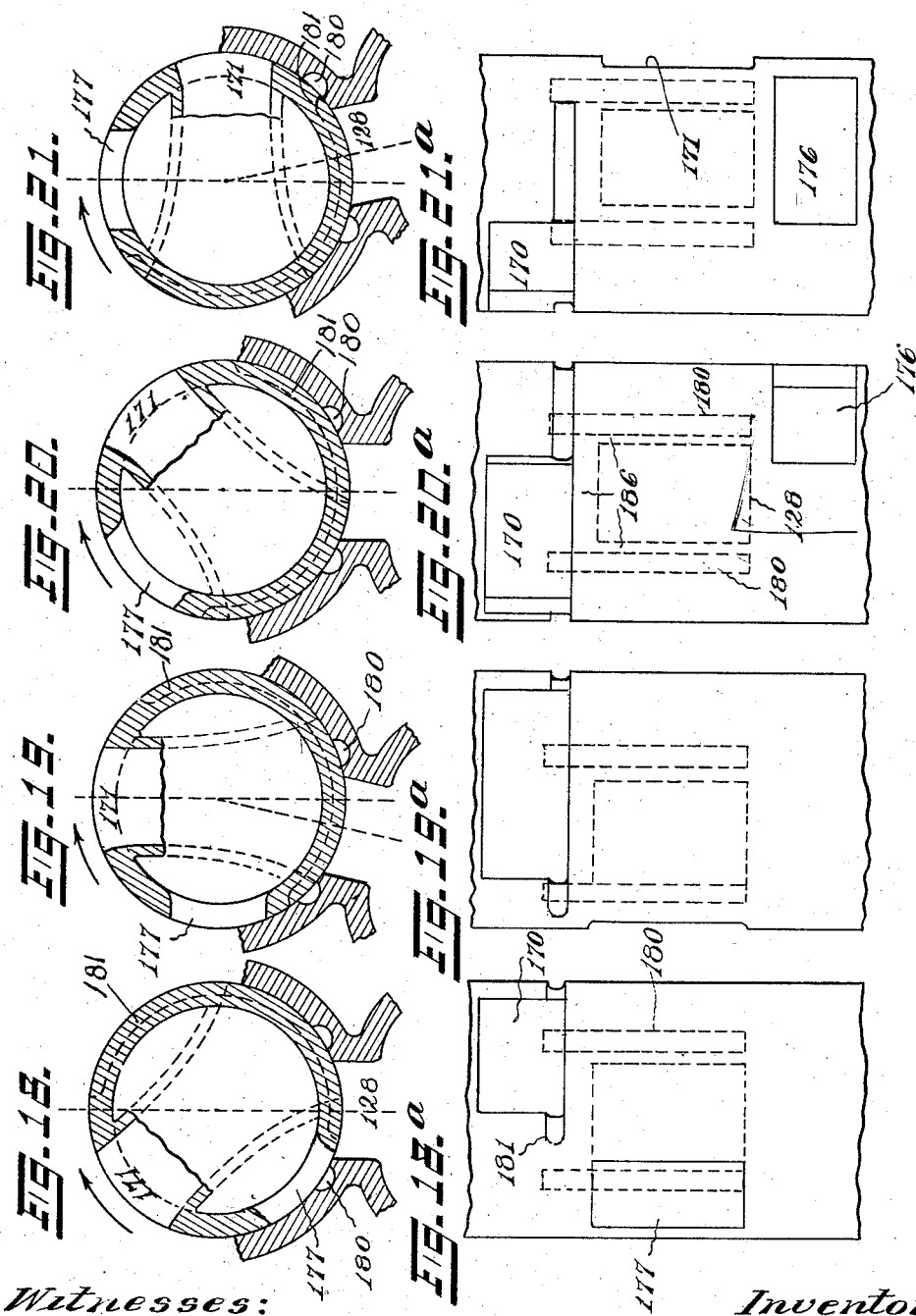

Patented Feb. 1, 1927.

1,616,029

UNITED STATES PATENT OFFICE.

HERMAN DOCK, OF PLEASANTVILLE, NEW YORK, ASSIGNOR TO THE DOCK ENGINE COMPANY, INC., OF NEW YORK, N. Y., A CORPORATION OF NEW YORK.

INTERNAL-COMBUSTION ENGINE.

Application filed December 19, 1922. Serial No. 607,793.

This invention relates to internal combustion engines and to rotary valves therefor, though it is noted that the invention is not limited to engines nor rotary valves nor even in some respects to valves.

One object of the invention is to provide an apparatus of this kind in which the valve action is adapted for either stationary cylinders or oscillatory cylinders, particularly the latter.

Another object of the invention is to provide an apparatus in which the valve is proof against detrimental leakage and is not affected by expansion of the parts.

Another object of the invention is to provide an apparatus or device of this kind which is relatively short for its power, which has a minimum of objectionable features and in which the thrust on piston and crank is direct.

A leading feature of the present improvements relates to the organization of valve mechanism whereby the timing of the port openings and port closure is effected in such a manner as to secure a high efficiency in the operation of the piston mechanism, and in the utilization of the piston actuating fluids.

A further feature consists in the combination of the aforesaid purposes of two coacting port-control members, of which one has a continuous rotary movement and of which the other has a rotative movement in opposite directions alternately and thereby producing a peculiar and effective control of the distribution of the piston actuating fluids.

One feature of the valve, or port-control, mechanism herein illustrated, consists in means in the nature of drainage channels or grooves located in part in one valve surface and in part in the other, but coacting, valve surface whereby the separative pressures due to interfacial flowage of the actuating fluids shall be controlled or limited in such a manner as to provide the necessary relief during one part of cycle of operation and to provide a protection against undue leakage or interfacial flowage,—especially from a supply port directly to an exhaust port, during one of the stages of the cycle of valve operation.

Another and important object is to provide for utilizing the aforesaid improvements in an organization of mechanism in which the said oscillating, or oppositely rotative, part of the control member may have its movement coincident with the oscillations of a cylinder in a piston machine of the oscillating type for thereby utilizing a single crank in connection with the oscillating movements of the cylinder and the reciprocation of the piston therein, and also for imparting said oscillating movements to said valve member, and for doing this in such a manner that the so-called "dead center" position of the crank as regards the piston stroke shall be transverse (approximately at right angles) to the "dead center" positions of the same crank relatively to the movements of the oscillatory valve member.

Other objects of the invention are to improve generally the simplicity and efficiency of such apparatus and to provide an apparatus of this kind which is durable, economical to manufacture and operate and which will not get out of order.

The inventive features for the accomplishment of these and other objects are shown in connection with an improved engine which, briefly stated, comprises a cylinder member provided with a sleeve having an oscillatory port, and a piston in the bore of the cylinder member connected to a crank of the crank shaft. A rotary valve member, in said sleeve, rotated at half the speed of the crank shaft is provided with an exhaust conduit positioned to communicate with said oscillatory port during exhaust and with an intake opening adapted for communication with said oscillatory port during the intake stroke.

The valve action herein described is for a four-cycle engine, but many of the features are adaptable for other styles of engines and valves.

Other objects of the invention will appear as the description proceeds; and while herein details of the invention are described, the invention is not limited to these, since many and various changes may be made without departing from the spirit of the invention, or exceeding the scope of the appended claims.

In the accompanying drawing, showing by way of example, two of many possible embodiments of the invention, Fig. 1 is an elevation of one form of engine embodying my invention;

Fig. 2 is a central vertical sectional view, partly in elevation of the engine, taken axially of the cylinder member and rotary valve member;

Fig. 3 is a substantially vertical sectional view, partly in elevation, taken on the line X³—X³ of Fig. 2 looking in the direction of the arrow of said line;

Figs. 3ª and 3ᵇ are enlarged vertical sectional views taken transversely of the valve member showing different positions of the parts;

Fig. 4 is a plan of the frame and oscillatory sleeve, parts being removed;

Fig. 5 is a transverse horizontal sectional view, partly in plan, taken axially of the main shaft;

Fig. 6 is a fragmental end elevation of the upper part of the engine;

Fig. 7 is a transverse horizontal sectional view, taken on the line X⁷ of Fig. 2, looking in the direction of the arrow of said line;

Fig. 8 is a vertical sectional view, partly in elevation of another form of the invention taken transverse to the axis of the valve member;

Fig. 9 is a plan of the engine of Fig. 8 having parts removed;

Fig. 10 is a vertical sectional view, partly in elevation, taken transverse to the section of Fig. 8;

Fig. 11 is an end elevation of the top of the engine;

Fig. 12 is a diagram representing the piston strokes;

Fig. 13 is a diagram showing piston positions and valve openings for different angular positions of the rotary valve members;

Figs. 14 to 21 are vertical sectional views taken through the valve member and associated parts, showing different relative positions of the parts, and Figs. 14ª to 21ª are fragmental plans of said parts corresponding respectively to Figs. 14 and 21.

My improved engine shown in Figs. 1 to 7 has the movable parts thereon carried on a mechanism supporting frame 5 comprising two spaced side members 6 (Fig. 3) provided at the lower part with base portions 7, and alined crank shaft bearings 8, and intermediately with inner vertical opposed slideways 11 (Fig. 7) and spring supports 12 (Fig. 3) below the lower ends of the slideways. Spacing rods 15 connect and hold spaced the lower parts of said side members.

A jacketed port head 16 secured by bolts 17 upon the upper end of the frame 5 is provided with a downwardly opening semi-cylindrical bearing surface 18 substantially co-axial with and cooperating to form sleeve bearings, with semi-circular bearing faces on bearing members 19 (Figs. 2 and 6) bolted to opposite ends of the lower part of the head. Downwardly opening intake and exhaust ports 20 and 21 respectively pass into said bearing surface 18 at opposite ends at widely separated intake and exhaust zones defined by said ports. Said ports extend oppositely laterally from the sides of the head and connect respectively with feed and exhaust pipes 22 and 23 (Fig. 1).

An oscillatory sleeve 25 diametrically oppositely longitudinally split as at 26 (Fig. 3ª) to permit transverse expansion of the valve member therein, is mounted in said sleeve bearing and is provided with a single oscillatory lower port 28 in a mid zone between said intake and exhaust zones, and with upper ports 30 and 31 remaining in communication with the inlet and exhaust ports 20 and 21 respectively (Fig. 2). A jacketed working cylinder member 33 provided with lateral vertical guides 34 (Figs. 3 and 7) engaged in said slideways 11 is provided at its upper end with an upwardly disposed bearing face 35 (Figs. 3 and 3ª) fitting on said sleeve 25 and provided axially of the piston with a large opening 36 remaining in unrestricted communication with said oscillatory port 28.

Referring to Figs. 2 and 3ª the large opening 36 is surrounded by a leakage relief channel 37 in said face always out of communication with said oscillatory port and communicating by a channel 38 with the atmosphere by way of the split opening 26 to permit the escape of any gases that may leak into the channel 37. The extent of any inter-facial pressure is thus limited by the channel 37. Strong springs 40 resting on said supports 12 of the side members press the bearing face of the cylinder member into close contact with the sleeve. The opening 36 being smaller than the cross-section of the cylinder bore forms an inner pressure face 39 surrounding the port; and the relief channel 37 surrounding the port forms an inner zone 41 of less area than said face 39. As the drainage channel 38 connects said relief channel with the exterior atmosphere, the pressure which may be exerted by leakage between the cylinder member and sleeve cannot be exerted in a zone beyond the channel 37 and can only be exerted in the zone 41. But as this zone is of much smaller area than the face 39, the total pressure on the face is always much greater than that in the zone, so that firmest contact at said zone is maintained when the pressure in the cylinder is greatest.

The piston 42 in the cylinder bore 43 of the cylinder member 33 is connected, by a connecting rod 44 (Fig. 3) pivoted as at 45 (Fig. 2) to the piston, with an intermediate main crank 48 of the crank shaft 49 in said bearings 8 of the side members 6. The crank shaft 49 carries a balance wheel 50 on one end of the shaft and a small crank 51 at the other. An actuating rod 54 connected to said small crank is universally pivoted to an arm 55 carried by a collar 56 (Figs. 1 and 2) fast on the sleeve 25. The crank 51 and arm 56 are of such proportion and position relative to the piston 42 that said lower port 28 is oscillated a convenient angle, say about 12°, each way from its lower vertical radius and is at its mid position at each end of the piston stroke. A rotary tubular mixing valve member 58 fitted in said sleeve is rotated at exactly half the speed of the main crank shaft by means comprising a counter shaft 59, bevel gears 60 and 61 connecting the counter shaft with the main shaft, a sprocket chain 62 and lower and upper sprocket wheels 63 and 64 carrying the chain and fixed respectively on said counter shaft 59 and valve member 58, the upper sprocket serving for retaining said valve member and sleeve in place at one end, while a flange collar 65 (Fig. 2) on the other end of the valve cylinder serves for retaining the valve and sleeve in place at the other end.

Conduit walls 68 (Fig. 2) form an exhaust conduit 69 (Fig. 3) passing diagonally through the valve cylinder out of communication with the interior thereof and having its discharge end 70 (Fig. 3) outside of said mid-zone and registerable with said exhaust port 21 during the exhaust stroke of the piston, and its receiving end 71 narrower than and positioned to communicate with said lower port 28 throughout, and just before the commencement of the exhaust stroke.

The valve member 25 is so timed, and has its direction of rotation such, as indicated by the arrow 75 of Fig. 3, that said oscillatory port 28 moves toward the receiving end 71 of the exhaust channel just before the exhaust stroke thereby to open the exhaust in advance of the commencement of the exhaust stroke, and then moves in the same direction as said receiving end 71 moves thereby to hold the exhaust channel in unrestricted communication with said lower opening during the latter part of the exhaust stroke and then moves in the reverse direction to effect quick cut-off. The valve action will be more fully explained in connection with the form of invention shown in Figs. 8 to 21.

The valve member 25 is provided with an intake inlet opening 76 registerable with said upper opening 30 and intake port 20 during the intake stroke. The valve member 25 has also an intake discharge opening 77 having its rear edge disposed a distance forward of the advance edge of the receiving end 71 of the exhaust conduit, an angular distance very slightly greater than the width of the oscillatory port 28 to minimize the time between intake and exhaust. Said intake discharge opening 77 is adapted for communication with said oscillatory port during the intake stroke whereby the intake mixture passing through the tubular valve member 25 in contact with the heated walls thereof and the walls 68 of the exhaust conduit 69 are thoroughly mixed by the rotary and heating action of the valve member, the centrifugal force throwing the heavier constituents into efficient vaporizing contact with the walls of the member. The oscillatory port 28 moves to meet intake discharge opening 77 during the first half of the intake stroke to effect quick full opening and moves with the intake discharge opening during the last half of the intake stroke to effect gradual closing, as will be fully explained in connection with Figs. 16 to 18.

The sleeve 25 is provided with a pair of relief channels 80 (Fig. 3ᵇ) longitudinally disposed in the inner face of the sleeve near and to the front and rear of the oscillatory port 28 and projecting into the exhaust zone, valve member 58 being provided with an arcuate connecting drainage channel 81 (Fig. 2) in said exhaust zone and extending through the discharge end 70 of the exhaust conduit to points near the receiving end 71 of the exhaust conduit and the intake discharge opening 70, as explained more fully with respect to Figs. 14 and 21. During compression, ignition and expansion the channels 80 and 81 form a barrier about the oscillatory port for the reception of escaped gases; and the channel 81 connects said channels 80 with the exhaust port during exhaust to permit the escape of the entrapped gases.

The description of the cooperative features of the two valve faces, one on the valve member proper and the other being on the oscillatory sleeve 25, having now been given in connection with diagrams in Figs. 1 to 7, it will be noted that the successive port openings and port closures take place in accordance with the continuously advancing movement of the valve face of the valve member 58 upon, and relatively to, the inner face of the oscillatory sleeve, so that the rate of port opening and port closure is independent of the non-movement or movement of the cylinder member 33 itself, but results entirely from the relative movement of the two ported surfaces of said valve member and sleeve; the one upon the other. When, however, the said ported valve face is on a cylindrical rotating member, and the sleeve member also has a swinging movement, as in oscillating cylinder engines, the said relative movement of the valve face upon the coactive ported face of the oscillatory sleeve is correspondingly varied as to the said relative rate of movement at successive periods in the rotation of the crank and as regards the stroke of the piston. Such an oscillating cylinder engine is shown in Figs. 8 to 21.

In the form of invention shown in Figs. 8 to 21, the movable parts of the engine are carried on a mechanism supporting frame 105 (Fig. 10) comprising two spaced side members 106 provided at the lower part with base portions 107, and alined crank shaft bearings 108, and at the upper part with sleeve bearing block recesses 109 (Fig. 11) provided at the edge faces with vertical opposed slideways 111 and at the bottom with widened recessed spring supports 112 below the level of the lower ends of the slideways. Bearing blocks 113 in said recesses are provided at the upper part with alined semi-circular valve member bearing faces 110 and at the side edges with vertical guides 114 received on said slideways 111. Spacing rods 115 (Fig. 10) connect and hold spaced the lower parts of said side members.

The jacketed valve-port head 116 similar to the head 16 (Fig. 1) is mounted on the frame and provided with a semi-cylindrical bearing surface 119 (Fig. 8) cooperating with said semi-circular faces 110 to form sleeve bearings, and having intake and exhaust ports 120 and 121 (Fig. 10) respectively passing into said surface 119 at widely separated intake and exhaust zones defined by said openings.

The working cylinder member 123 (Fig. 8) is integrally provided at its upper end with an oscillatory sleeve 125 diametrically oppositely longitudinally split as at 126, and mounted in said sleeve bearing against said surface 119 and provided with a single oscillatory lower port 128 in a mid zone between and separate from said intake and exhaust zones. Said sleeve is provided with upper ports 130 and 131 (Fig. 10) remaining in communication with the inlet and exhaust ports 120 and 121 respectively. Strong springs 140 (Fig. 11) resting in said recessed supports 112 of the side members and in the bores 141 of said blocks 113 press the bearing face of the oscillatory sleeve into close contact with said bearing surface 119.

A piston 142 (Fig. 8) in the bore 143 of cylinder member is provided with downwardly extending connecting rod members 144 received in grooves 145 in a pair of piston-guide extensions 146 extending longitudinally downwardly from opposite sides of the lower end of the cylinder member. Said rod members have a connecting yoke portion 147 forming the upper portion of a crank bearing receiving a crank 148 (Fig. 10) of a crank shaft 149 in said bearings 108 of the side members and carrying a balance wheel 150. A lower bearing member 151 (Fig. 8) bolted to said yoke portion complementary to the upper member 147 completes the crank bearing. Said crank 148 is of such length relative to the piston member that said oscillatory port 128 is oscillated a suitable angle, say about 12°, each way from its lower vertical radius, and the port is obviously at its mid position at each end of the piston stroke, as shown in Figs. 14, 16, 18 and 20. A rotary tubular mixing valve member 158 fitted in said sleeve 125 is very similar to the rotary valve member 58 and is rotated at exactly half the speed of the main crank shaft by means comprising a fixed idler shaft 159 (Fig. 10), an idler gear 162 loose on the idler shaft and gears 163 and 164 meshing therewith and fixed respectively on said main shaft 149 and valve 158, the upper gear 164 serving for retaining said valve member and sleeve in place at one end, a flange or collar 165 fixed on the other end of the valve cylinder serving for retaining the valve and sleeve in place at that end.

As in said rotary valve member 58 (Fig. 1), an exhaust conduit 169 (Figs. 8 and 14) passes diagonally through the valve member 158 and has its wide discharge end 170 outside of said mid-zone and registerable with said exhaust port during exhaust, and its receiving end 171 positioned to communicate with said oscillatory port 128 throughout, and just before, the commencement of the exhaust stroke.

In the diagram of Fig. 12, the arrows represent the piston movement and direction and are labeled to indicate the order of the stroke.

In the diagram of Fig. 13, the radii between the circumference and the light line $p$ are substantially proportional to the displacement of the piston from its lower limit for different positions of the rotary valve member. The dotted radii represent angular positions of the valve member as shown in Figs. 14 to 21, the numerals 14 to 21 illustrate the valve positions approximately corresponding to such radii. The capital letters designate the radii of valve positions corresponding to the piston positions respectively as follows: L, lower limit; E, exhaust stroke; U, upper limit; I, intake stroke; L, lower limit; C, compression stroke; F, firing dead center position; and P, power stroke.

The radii between the circumference and the heavy line $e$ are proportional to the amount of valve opening during exhaust; and the radii between the circumference and the line $i$ are proportional to the amount of valve opening during intake.

The valve member 158 is so timed and, as shown by the arrows of Figs. 13 to 21, has its direction of rotation such that the oscillatory port 128 has moved (rightwardly in Fig. 21) toward the receiving end 171 of the exhaust channel at the middle of the power stroke just before the commencement of the exhaust stroke (as indicated by $e'$ of Fig. 13), thereby to meet the receiving end 171 and open the exhaust and permit commencement of scavenging slightly in advance of the commencement of the exhaust stroke so that the exhaust will then be slightly open as shown in Fig. 14, and as indicated by the radial line segment L14, $e^2$ of Fig. 13. As the piston completes the power stroke, the port 123 moves to its mid position and continues to move in the same direction as said receiving end 171 moves to the position of Fig. 15, thereby to open the exhaust channel fully and hold it fully open in unrestricted and efficient scavenging communication with the exhaust port during the third quarter of the exhaust stroke as indicated by the line segment $e^3$ $e^4$ of Fig. 13. The port 128 then moves, from the position of Fig. 15 to that of Fig. 16, in the reverse direction to the receiving end 171 to effect quick cut-off, as indicated by the sharply inclined segment $e^4$ $e^5$.

The valve member 158 is provided with an intake inlet opening 176 registerable with said upper opening 130 and intake port 120 during the intake stroke, and an intake discharge opening 177 disposed in its entirety forward of the receiving end 171 a distance very slightly greater than the width of the oscillatory port, as shown in Fig. 16, as stated of the valve member 58. The opening 177 is adapted for communication with said oscillatory port 128 during the intake stroke, whereby the intake mixture is mixed by the rotary and heating action of the valve member. The oscillatory valve meets the intake discharge opening 177 at the commencement of the intake stroke, at about the position $i''$ of Fig. 13, and as shown in Fig. 16 and continues to move toward the opening 177 during the first half of the intake stroke to effect quick full opening, as indicated by the line segment $i'$, $i^2$ which is maintained a short while as indicated by the segment $i^2, i^3$; and moves in the same direction as the intake discharge opening 177 during the last half of the intake stroke to effect gradual closing, as indicated by the segment $i^3$, it to prevent shock to the intake air column. Fig. 18 shows the intake nearly closed. The inner face of the sleeve 125 is provided with a pair of relief channels 180 (Figs. 14 and 14ᵃ) longitudinally disposed to the front and rear of the oscillatory port 128 and projecting into the exhaust zone. The valve member 158 is provided in said exhaust zone, and near but outside of said mid-zone, but remote from the intake zone, with an arcuate drainage channel 181 extending through the discharge end 170 (Fig. 17) of the exhaust conduit to points 185 and 186 near the receiving end 171 of the exhaust conduit and near the intake discharge opening 177. During compression (Fig. 19), ignition (Fig. 20) and expansion (Fig. 21), the channels 180 and 181 connect and form a flowage barrier about the oscillatory port for the reception of leakage of explosion gases; and said channels are connected with the exhaust port during exhaust (Figs. 14 and 15) to permit the escape of the entrapped gases. Said channels never permit the escape of the intake gases, or the mingling of the intake and exhaust. As the channel 180 is remote from opening 176 and is outside of the mid-zone, and terminates short of the opening 177, it does not at any time directly connect the intake with the exhaust. As the channels 180 are outside of the intake zone, they never directly connect with the opening 130. Figs. 16, 17 and 18 show the extreme positions in which the intake opening 177 communicates with the channels 180. In Fig. 16, the intake is closed and the channel 181 does not reach either channel 180. In Fig. 17, the exhaust conduit is entirely closed. In the position of Fig. 18, the opening 177 is closed and neither the port 128 nor the channel 181 has access to the channel 180 with which the opening 177 then communicates.

As both openings 176 and 177 are outside of the exhaust zone, they never can communicate with the exhaust port itself.

The mechanism just described makes possible an efficient valve action for oscillating cylinder engines, whereby advantage can be taken of the low height, absence of wrist-pin and direct piston thrust inherent in the oscillatory cylinder type of engine.

The oscillatory port 128 being smaller than the cross-section of the cylinder bore forms an inner pressure face 85 (Fig. 8) surrounding the port; and the channels 180 and 181 surrounding the port form a partial inner zone 186 (Fig. 20ᵃ) of less area than said face 85. As the channels form a sort of storage chamber for relieving the pressure which may be exerted by leakage between the cylinder member and sleeve, this pressure cannot be exerted in a zone beyond the channels and can therefore only be exerted in this zone 186. But as this zone is of much smaller area than the face 185, the total pressure on the face 185 is always much greater than, and more than counterbalances, that in the zone 186, so that firmest contact at said zone is maintained when the pressure in the cylinder is greatest.

The sleeve 125, being longitudinally split at 126, is transversely expansible against the action of the springs 140, thus permitting transverse expansion of the rotary valve member 158 under action of heat, and is always held in efficient contact with the valve member and port head by the pressure of the explosion and of the springs 140.

I claim:

1. In an internal combustion engine, an actuating fluid distribution control device comprising oscillatory means having a plurality of more than two ports, hollow continuously rotary means cooperating with the oscillatory means and having a plurality of more than two ports and means for rotating said rotary means to cause the ports of said rotary means successively to register with the ports in said oscillatory means to establish communication therewith and again to come out of register and shut off communication therewith.

2. In an internal combustion engine, an actuating fluid distribution control device comprising oscillatory means having a plurality of more than two ports, and hollow continuously rotary means cooperating with the oscillatory means and having a plurality of more than two ports, two of the ports of said rotary means being operatively connected and separated by the operatively connecting means from the other ports of the rotary means.

3. In an internal combustion engine, an actuating fluid distribution control device comprising oscillatory means having an actuating fluid intake port, an actuating fluid outlet port and a used fluid discharge port, and continuously rotary means cooperating with the oscillatory means and having an actuating fluid intake port, an actuating fluid outlet port, a used fluid intake port, and a used fluid outlet port, the last mentioned ports being operatively connected and separated by the connecting means from the other ports of the rotary means.

4. In an internal combustion engine, an actuating fluid distribution control device comprising oscillatory means having an actuating fluid intake port, an actuating fluid outlet port and a used fluid discharge port, and continuously rotary means cooperating with the oscillatory means and having an actuating fluid intake port, an actuating fluid outlet port, a used fluid intake port and a used fluid outlet port, the used fluid intake port and the used fluid outlet port of the rotary means being connected by a conduit.

5. In an internal combustion engine, in combination, oscillatory valve means having an actuating fluid intake port, an actuating fluid outlet port and a used fluid discharge port; continuously rotary valve means having an actuating fluid intake port, an actuating fluid outlet port, a used fluid intake port and a used fluid outlet port; and a cylinder having a port operative at one time as an actuating fluid intake port and at another time as a used fluid outlet port; the actuating fluid intake port of the oscillatory means coacting with the actuating fluid intake port of the rotary means, the actuating fluid outlet port of the rotary means coacting with the port of said cylinder when said port acts as an actuating fluid intake port, the used fluid intake port of the rotary means coacting with the port of said cylinder when said cylinder port acts as a used fluid outlet port, and coacting with the used fluid discharge port of the oscillatory means for clearing said cylinder of used fluid, the actuating fluid outlet port of the oscillatory means being at all times in communication with said cylinder port.

6. In an internal combustion engine, in combination, oscillatory valve means having an actuating fluid intake port, an actuating fluid outlet port and a used fluid discharge port; continuously rotary valve means having an actuating fluid intake port, an actuating fluid outlet port, a used fluid intake port and a used fluid outlet port; the used fluid intake and the used fluid outlet ports of the rotary means being operatively connected by a conduit; and a cylinder having a port operative at one time as an actuating fluid intake port and at another time as a used fluid outlet port; the actuating fluid intake port of the oscillatory means coacting with the actuating fluid intake port of the rotary means, the actuating fluid outlet port of the rotary means coacting with the port of the cylinder when said port acts as an actuating fluid intake port, the used fluid intake port of the rotary means coacting with the port of the cylinder when said cylinder port acts as a used fluid outlet port, and the conduit-connected used fluid intake and used fluid outlet ports of the rotary means coacting with the used fluid discharge port of the oscillatory means; the actuating fluid outlet port of the oscillatory means being at all times in communication with said cylinder port.

7. In an internal combustion engine, in combination, an oscillatory sleeve valve having an actuating fluid intake port, an actuating fluid outlet port and a used fluid discharge port; a continuously rotary hollow valve member within said sleeve and having an actuating fluid intake port, an actuating fluid outlet port, a used fluid intake port and a used fluid outlet port, the used fluid intake and used fluid outlet ports of the rotary member being operatively connected by a conduit; and a cylinder having a port operative at one time as an actuating fluid intake port and at another time as a used fluid outlet port; the actuating fluid intake port of said sleeve coacting with the actuating fluid intake port of the rotary member, the actuating fluid outlet port of the rotary member coacting with the port of said cylinder when said port acts as an actuating fluid intake port, the used fluid intake port of the rotary member coacting with the port of said cylinder when said cylinder port acts as a used fluid outlet port, and the conduit-connected used fluid intake and used fluid outlet ports of the rotary member coacting with the used fluid discharge port of the oscillatory sleeve, the actuating fluid outlet port of the oscillatory sleeve being at all times in communication with said cylinder port.

8. In an internal combustion engine, in combination, a head member having an actuating fluid intake and a used fluid discharge and having an actuating fluid outlet port and a used fluid intake port; an oscillatory valve member having an actuating fluid intake port, an actuating fluid outlet port and a used fluid discharge port, said actuating fluid intake and used fluid discharge ports being respectively in continuous operative relation to the actuating fluid outlet port and the used fluid intake port of the head member during oscillation of the oscillatory member; and a hollow continuously rotary valve member cooperating with the oscillatory member and having an actuating fluid intake port, an actuating fluid outlet port, a used fluid intake port, and a used fluid outlet port operatively connected to said used fluid intake port.

9. In an internal combustion engine, in combination, a head member having an actuating fluid intake and a used fluid discharge and having an actuating fluid outlet port and a used fluid intake port; an oscillatory valve member having an actuating fluid intake port, an actuating fluid outlet port and a used fluid discharge port, said actuating fluid intake and used fluid discharge ports being respectively in continuous operative relation to the actuating fluid outlet port and the used fluid intake port of the head member during oscillation of the oscillatory member; a hollow continuously rotary valve member cooperating with the oscillatory member and having an actuating fluid intake port, an actuating fluid outlet port, a used fluid intake port, and a used fluid outlet port operatively connected to the last mentioned fluid intake port; and a cylinder having a port operative at one time as an actuating fluid intake port and at another time as a used fluid outlet port; the actuating fluid outlet port of the rotary member coacting with the port of said cylinder when said port acts as an actuating fluid intake port, the used fluid intake port of the rotary member coacting with the port of said cylinder when said port acts as a used fluid outlet port, the actuating fluid outlet port of the oscillatory member being at all times in communication with said cylinder port.

10. In an internal combustion engine, in combination, an actuating fluid distribution control device comprising an oscillatory member having a plurality of more than two ports, and a hollow continuously rotary member cooperating with the oscillatory member and having a plurality of more than two ports; a cylinder having a port operative at one time as an actuating fluid intake port and at another time as a used fluid outlet port and cooperating with said distribution control device; and a reciprocable piston in said cylinder; said oscillatory and continuously rotary members being operated by movement of said piston.

11. In an internal combustion engine, in combination, an actuating fluid distribution control device comprising an oscillatory member having an actuating fluid intake port, an actuating fluid outlet port and a used fluid discharge port, and a hollow continuously rotary member cooperating with the oscillatory member and having an actuating fluid intake port, an actuating fluid outlet port, a used fluid intake port and a used fluid outlet port, the used fluid intake port and the used fluid outlet port of the rotary member being operatively connected; a cylinder having a port operative at one time as an actuating fluid intake port and at another time as a used fluid outlet port and cooperating with said distribution control device; and a reciprocable piston in said cylinder; said oscillatory and continuously rotary members being operated by movement of said piston.

12. In an internal combustion engine, in combination, a head member having a plurality of more than two ports; an actuating fluid control device cooperating with the head member and comprising an oscillatory member having a plurality of more than two ports, and a hollow continuously rotary member cooperating with the oscillatory member and having a plurality of more than two ports; a cylinder having a port operative at one time as an actuating fluid intake port and at another time as a used fluid outlet port and cooperating with said distribution control device; and a reciprocable piston in said cylinder; said oscillatory and continuously rotary members being operated by movement of said piston.

13. In an internal combustion engine, in combination, a head member having an actuating fluid intake and a used fluid discharge and having an actuating fluid outlet port and a used fluid intake port; an actuating fluid distribution control device cooperating with the head member and comprising an oscillatory member having an actuating fluid intake port, an actuating fluid outlet port and a used fluid discharge port, and a hollow continuously rotary member cooperating with the oscillatory member and having an actuating fluid intake port, an actuating fluid outlet port, a used fluid intake port and a used fluid outlet port, the used fluid intake port and the used fluid outlet port of the rotary member being operatively connected; a cylinder having a port operative at one time as an actuating fluid intake port and at another time as a used fluid outlet port and cooperating with said control distribution device; and a reciprocable piston in said cylinder; said oscillatory and continuously rotary members being operated by movement of said piston.

14. In an internal combustion engine, in combination, an actuating fluid distribution control device comprising an oscillatory member having an actuating fluid intake port, an actuating fluid outlet port and a used fluid discharge port, and a continuously rotary member cooperating with the oscillatory member and having an actuating fluid intake port, an actuating fluid outlet port, a used fluid intake port and a used fluid outlet port; a cylinder having a port operative at one time as an actuating fluid intake port and at another time as a used fluid outlet port; the actuating fluid outlet port of the rotary member coacting with the port of the cylinder when said port acts as an actuating fluid intake port, the used fluid intake port of the rotary member coacting with the cylinder port when said port acts as a used fluid outlet port, the actuating fluid outlet port of the oscillatory member being at all times in communication with said cylinder port; and means appurtenant to said cylinder located adjacently to the port thereof cooperating with means communicating with the atmosphere and appurtenant to the oscillatory member for limiting the inter-facial pressure between the oscillatory member and said cylinder.

15. In an internal combustion engine, in combination, an actuating fluid distribution control device comprising an oscillatory member having an actuating fluid intake port, an actuating fluid outlet port and a used fluid discharge port, and a continuously rotary member cooperating with the oscillatory member and having an actuating fluid intake port, an actuating fluid outlet port, a used fluid intake port and a used fluid outlet port; a cylinder having a port operative at one time as an actuating fluid intake port and at another time as a used fluid outlet port; the actuating fluid outlet port of the rotary member coacting with the port of the cylinder when said port acts as an actuating fluid intake port, the used fluid intake port of the rotary member coacting with the cylinder port when said port acts as a used fluid outlet port, the actuating fluid outlet port of the oscillatory member being at all times in communication with said cylinder port; and a channel in said cylinder adjacent to the port thereof cooperating with a channel in the oscillatory member communicating with the atmosphere for limiting the inter-facial pressure between the oscillatory member and said cylinder.

16. In an internal combustion engine, in combination, an actuating fluid distribution control device comprising an oscillatory member having an actuating fluid intake port, an actuating fluid outlet port and a used fluid discharge port, and a continuously rotary member cooperating with the oscillatory member and having an actuating fluid intake port, an actuating fluid outlet port, a used fluid intake port and a used fluid outlet port; a cylinder having a port operative at one time as an actuating fluid intake port and at another time as a used fluid outlet port; the actuating fluid outlet port of the rotary member coacting with the port of the cylinder when said port acts as an actuating fluid intake port, the used fluid intake port of the rotary member coacting with the cylinder port when said port acts as a used fluid outlet port, the actuating fluid outlet port of the oscillatory member being at all times in communication with said cylinder; and means appurtenant to the oscillatory member cooperating with means appurtenant to the rotary member for providing a barrier for the reception of escaped gases during compression, ignition and expansion in said cylinder.

17. In an internal combustion engine, in combination, an actuating fluid distribution control device comprising an oscillatory member having an actuating fluid intake port, an actuating fluid outlet port and a used fluid discharge port, and a continuously rotary member cooperating with the oscillatory member and having an actuating fluid intake port, an actuating fluid outlet port, a used fluid intake port and a used fluid outlet port; a cylinder having a port operative at one time as an actuating fluid intake port and at another time as a used fluid outlet port; the actuating fluid outlet port of the rotary member coacting with the port of the cylinder when said port acts as an actuating fluid intake port, the used fluid intake port of the rotary member coacting with the cylinder port when said port acts as a used fluid outlet port, the actuating fluid outlet port of the oscillatory member being at all times in communication with said cylinder; and a pair of channels cooperating with a channel in the rotary member for providing a barrier for the reception of escaped gases during compression, ignition and expansion in said cylinder.

18. In an internal combustion engine, in combination, an actuating fluid distribution control device comprising an oscillatory member having an actuating fluid intake port, an actuating fluid outlet port and a used fluid discharge port, and a continuously rotary member cooperating with the oscillatory member and having an actuating fluid intake port, an actuating fluid outlet port, a used fluid intake port and a used fluid outlet port; a cylinder having a port operative at one time as an actuating fluid intake port and at another time as a used fluid outlet port; the actuating fluid outlet port of the rotary member coacting with the port of the cylinder when said port acts as an actuating fluid intake port, the used fluid intake port of the rotary member coacting with the cylinder port when said port acts as a used fluid outlet port, the actuating fluid outlet port of the oscillatory member being at all times in communication with said cylinder; and a pair of parallel channels in the oscillatory member co-operating with an arcuate channel in the rotary member for providing a barrier for the reception of escaped gases during compression, ignition and expansion in said cylinder.

19. In an internal combustion engine, in combination, an oscillatory valve member having ports and split longitudinally and diametrically oppositely of the member to provide a plurality of equal symmetrical portions; and means for maintaining said portions in separated relation and concurrently oscillatable on the same axis.

20. In an internal combustion engine, in combination, an oscillatory valve member having ports and split longitudinally and diametrically oppositely of the member to provide a plurality of equal symmetrical portions; and spring pressed means for maintaining said portions in separated relation and concurrently oscillatable on the same axis.

21. In an internal combustion engine, in combination, an oscillatory valve member having ports and split longitudinally and diametrically oppositely of the member to provide a plurality of equal symmetrical portions; means for maintaining said portions in separated relation and concurrently oscillatable on the same axis; and a valve member having ports and continuously rotatable within the oscillatory member for cooperating therewith; the separating opening between the portions of the oscillatory member permitting expansion and contraction of the continuously rotatable member.

22. In an internal combustion engine, in combination, an oscillatory valve member having ports and split longitudinally and diametrically oppositely of the member to provide equal symmetrical portions; spring pressed means for maintaining said portions in separated relation and concurrently oscillatable on the same axis; and a valve member having ports and continuously rotatable within the oscillatory member for cooperating therewith; the separating opening between the portions of the oscillatable member permitting expansion and contraction of the continuously rotatable member.

23. In an internal combustion engine, in combination, an oscillatory valve member having ports and a channel and split longitudinally of the member to provide equal symmetrical portions; means for maintaining said portions in separated relation and concurrently oscillatable on the same axis, the separating opening between said portions communicating with the atmosphere; a cylinder having a port therein cooperating with one of the ports of the oscillatable member and having a channel adjacent to said port, the channel of the oscillatable member communicating at one end with said separating opening and at its opposite end with said channel of the cylinder.

24. In an internal combustion engine, in combination, an oscillatory valve member having ports and a channel and split longitudinally of the member to provide equal symmetrical portions; means for maintaining said portions in separated relation and concurrently oscillatable on the same axis, the separating opening between said portions communicating with the atmosphere; a cylinder having a port therein cooperating with one of the ports of the oscillatable member and having a channel around said port, the channel of the oscillatable member communicating at one end with said separating opening and at its other end with said channel of the cylinder.

25. In an internal combustion engine, in combination, oscillatory valve means having an actuating fluid intake port, an actuating fluid outlet port and a used fluid discharge port; continuously rotary valve means having an actuating fluid intake port, an actuating fluid outlet port, a used fluid intake port and a used fluid outlet port; and a cylinder having a port operative at one time as an actuating fluid intake port and at another time as a used fluid outlet port; the actuating fluid intake port of the oscillatory means coacting with the actuating fluid intake port of the rotary means, the actuating fluid outlet port of the rotary means coacting with the port of said cylinder when said port acts as an actuating fluid intake port, the used fuel intake port of the rotary means being narrower than and coacting with the port of said cylinder when said cylinder port acts as a used fluid outlet port, and coacting with the used fluid discharge port of the oscillatory means for clearing said cylinder of used fluid, the actuating fluid outlet port of the oscillatory means being at all times in communication with said cylinder port.

26. In combination, a valve port head provided with a curved bearing surface and intake and exhaust ports respectively passing into said bearing surface at opposite ends; a cylinder member provided with an oscillatory valve sleeve yieldably pressed and fitted against said bearing surface and provided intermediately with an oscillatory port; a piston in the bore of the cylinder member; a crank connected to said piston; a rotary tubular valve member in said sleeve rotated at half the speed of the crank shaft, and having an exhaust conduit passing diagonally therethrough having its discharge end registerable with said exhaust port and its receiving end positioned to communicate with said oscillatory port during exhaust; said valve member being provided with an intake inlet opening and an intake discharge opening adapted for communication with said intake port and oscillatory port respectively during the intake stroke.

27. In combination, a valve port head provided with a curved bearing surface and intake and exhaust ports respectively passing into said bearing surface at opposite ends; a cylinder member provided with an oscillatory valve sleeve yieldably pressed and fitted against said bearing surface and provided intermediately with an oscillatory port, interior relief channels to the front and rear of the oscillatory port; a piston in the bore of the cylinder member; a main shaft having a crank connected to said piston; a rotary tubular valve member fitted in said sleeve; rotating means for rotating said rotary valve member at exactly half the speed of the main crank shaft and comprising an idler shaft, a gear loose on the idler shaft and gears meshing therewith and fixed respectively on said main shaft and valve, the upper gear serving for retaining said valve member and sleeve in place at one end; and a flange collar on the other end of the valve cylinder for retaining the valve and sleeve in place at the other end.

28. In combination, a valve port head provided with a curved bearing surface and intake and exhaust ports respectively passing into said bearing surface at opposite ends thereof; a cylinder member having a port; an oscillatory valve sleeve yieldably pressed and fitted against said bearing surface and provided with an oscillatory port cooperating with the port of the cylinder member and provided with relief channels to the front and rear of said oscillatory port; a piston in the cylinder member; a main shaft having a crank connected to said piston; a rotary tubular valve member fitted in said sleeve; and means for rotating said valve member at half the speed of the main crank shaft.

29. In combination, a cylinder provided with a sleeve having an oscillatory port communicating with the interior of the cylinder; a piston in the cylinder; a crank shaft having a crank connected to said piston; a rotary tubular valve member in said sleeve rotated at half the speed of the crankshaft, and having an exhaust conduit passing diagonally therethrough having its receiving end positioned to communicate with said oscillatory port during exhaust; said valve member being provided with an intake inlet opening and an intake outlet opening adapted for communication with said oscillatory port during the intake stroke, whereby the intake mixture passing through the tubular valve member in contact with the heated walls thereof and of the exhaust conduit is thoroughly mixed by the rotary and heating action of the valve member.

30. In combination, a frame; a valve port head on the frame provided with a curved bearing surface; an oscillatory sleeve mounted against said bearing surface and provided with a lower oscillatory port, a pair of inner longitudinal relief channels to the front and rear of the oscillatory port; a working cylinder member provided at its upper end with an upwardly disposed bearing face fitting on said sleeve and provided axially of the piston with a large opening remaining in communication with said oscillatory port, said large opening being surrounded by a relief channel in said face always out of communication with said oscillatory port and communicating with the atmosphere; and a rotary valve member having exhaust and intake openings adapted for communication at times with said reciprocatory port, and a drainage channel at times connecting said relief channels with each other or the exhaust.

31. In combination, a frame comprising side members provided at the lower part with shaft bearings, at the upper part with alined bearing faces and intermediately with vertical opposed slideways and spring supports below the slideways; a head on the frame provided with a curved bearing surface cooperating with said faces to form sleeve bearings; a longitudinally split oscillatory sleeve mounted in said sleeve bearings and provided with an oscillatory lower port; a working cylinder member provided with lateral vertical guides engaged in said slideways, and at its upper end with an upwardly disposed bearing face fitting on said sleeve and provided axially of the piston with a large opening remaining in communication with said oscillatory port; springs resting on said supports pressing the bearing face of the cylinder member into close contact with the sleeve and tending transversely to compress the split sleeve; a piston in the bore of the cylinder member; a shaft in said shaft bearings having a crank connected to said piston; and a rotary tubular valve member in said sleeve having openings registerable at times with said oscillatory port.

32. In a motor-mechanism of the class described, in combination, a mechanism-supporting frame; a cylinder-member appurtenant to the frame and having in the bore thereof a reciprocable piston operably connected with the crank of a crank-shaft which is rotatably supported by the frame, this cylinder-member having a ported valve-face fitted for coaction with a cylindrical rotary ported valve and also having formed longitudinally therein a cylinder-port and a pair of non-connecting channels which are located alongside of and non-contiguous to the two sides, respectively, of said port, and which are extended at one end thereof in said valve-face to project beyond the end of said port; a multi-ported and rotary cylindrical valve coactive with said ported valve-face and the cylinder port thereof, and having exhaust and intake conduits and ports which are located in a cylinder-port-controlling zone of this cylindrical valve and in positions for coacting in succession with said port of the cylinder valve-face; valve-rotating means in position and connected for actuating the cylindrical valve one revolution for each two revolutions of the crank-shaft and thereby timing the operation of the valve ports for an operating cycle which includes a compression stroke of the piston; and, said rotary valve having formed circumferentially therein a circular-arc drainage-channel located to one side of said cylinder-port-controlling zone and discharging into an exhaust conduit, said drainage-channel being also positioned circumferentially of the valve for connecting with said projecting ends of said cylinder-valve-face channels during a compression stroke of the piston, and thereby restrict interfacial-flowage circumferentially of the rotary valve during a period of high pressure within the cylinder.

33. In combination, a cylinder member provided with a sleeve having end exhaust and intake zones and a mid-zone provided with a single oscillatory lower port in the mid-zone outside of said intake and exhaust zones, and a pair of relief channels longitudinally disposed in the inner face of the sleeve to the front and rear of the oscillatory port and projecting into the exhaust zone; a piston in the cylinder; and a rotary valve member having an exhaust conduit positioned to communicate with said oscillatory port during exhaust, and an intake opening adapted for communication with said oscillatory port intake; said valve member being provided in said exhaust zone with an arcuate connecting channel extending through the exhaust conduit to points near the receiving ends of the exhaust conduit and the intake opening; thereby, during compression, ignition and expansion, forming a flowage barrier about the oscillatory port and connecting said channels with the exhaust port during exhaust.

34. In combination, a cylinder member having its head provided with a port smaller than the cross-section of the cylinder bore and forming an inner pressure face surrounding the port; a piston in the cylinder bore; and a movable member having exhaust and intake openings adapted for communication at times with said port; channels being formed in said head near and partly surrounding the port and forming an inner zone of less area than said face and connecting with the exterior atmosphere.

35. In combination, a cylinder having its head provided with a reciprocatory port smaller than the cross-section of the cylinder bore and forming an inner pressure face surrounding the port, the outer face of the head having therein relief channels near and partly surrounding the port and forming an inner zone of less area than said face; and a movable member having exhaust and intake openings adapted for communication at times with said port, and having a drainage channel at times connecting said relief channel with the exterior atmosphere.

36. In combination, a cylinder having its head provided with a port smaller than the cross-section of the cylinder bore and forming within the cylinder an inner pressure face surrounding the port, the outer face of the head having therein a relief channel surrounding the port and having a drainage channel connecting said relief channel with the exterior atmosphere and forming an inner zone of less area than said face; a piston in the cylinder; and a movable member having exhaust and intake openings adapted for communication at times with said port.

HERMAN DOCK.